Nov. 28, 1950 R. C. FERRAR 2,531,416
CONTROL CIRCUIT FOR RADIO RECEIVERS
Filed Sept. 27, 1946
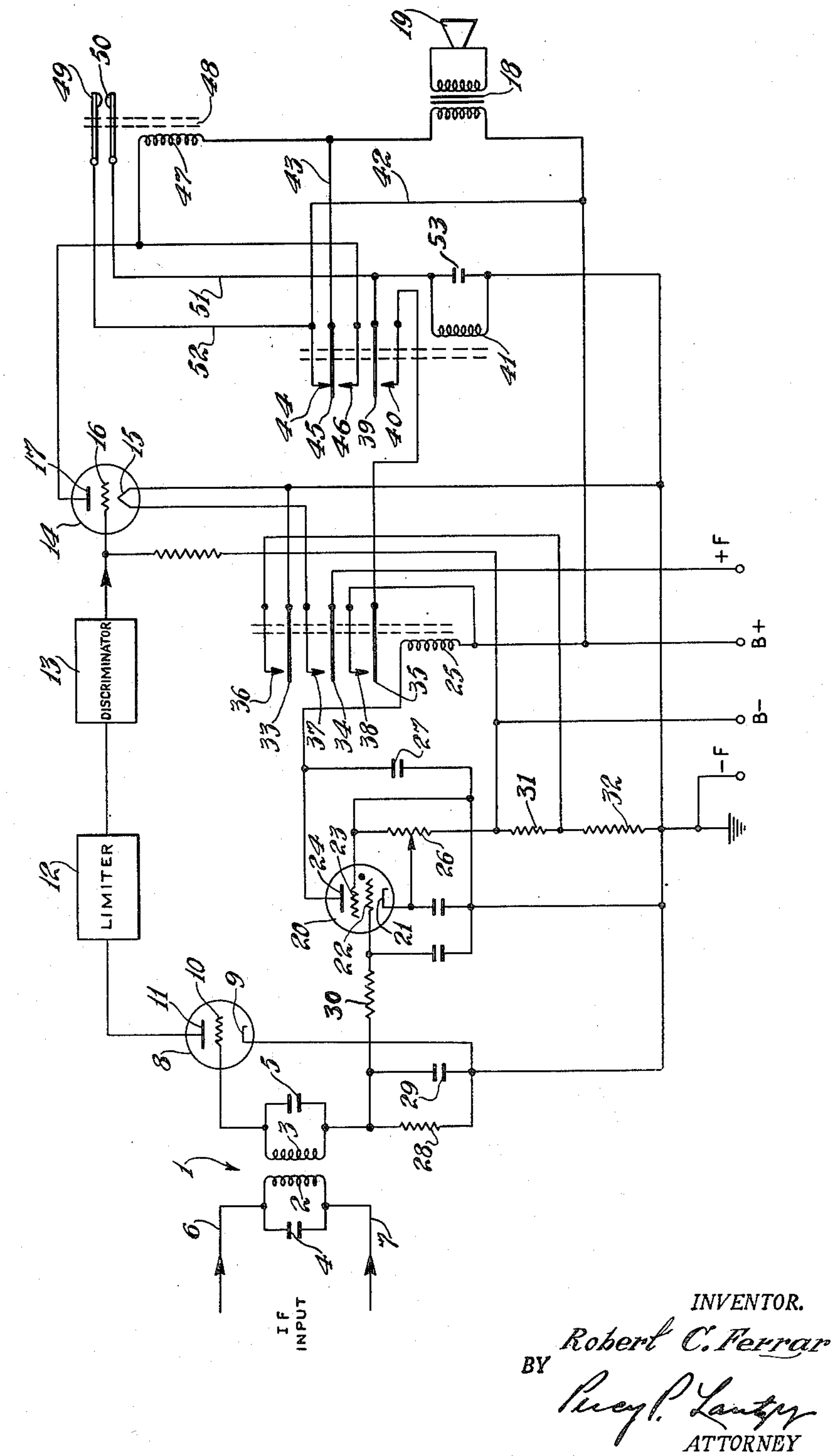
INVENTOR.
Robert C. Ferrar
BY
Percy P. Lantzy
ATTORNEY Patented Nov. 28, 1950

2,531,416

UNITED STATES PATENT OFFICE 2,531,416

CONTROL CIRCUIT FOR RADIO RECEIVERS

Robert C. Ferrar, New Providence, N. J., assignor to Federal Telephone and Radio Corporation, New York, N. Y., a corporation of Delaware Application September 27, 1946, Serial No. 699,683

6 Claims. (Cl. 250—20)

This invention relates to a system for selectively calling a station in a communication system, and has for its principal object to provide a simple means for selectively calling a desired station and putting it into operation to receive signals from the calling station.

Systems of communication have heretofore been proposed in which a central or calling station is provided with means for calling one or more outlying stations; and in these systems it has been a common practice to provide a common frequency channel for transmitting to all of the stations. Such a system has been used for example, in police communications and in other similar services to call a desired one of a number of remote mobile or field stations from the central control or calling station. In such a communication system it is desired to provide some means for calling and selecting the particular one of the call stations to which it is desired to transmit signals and to put this particular station into operating relation with the calling station.

It is the purpose of my present invention to provide a simplified and relatively economical system for accomplishing the calling operation and putting the called station into operating relation with the calling station. In accordance with my invention, I utilize a single vibrating reed set. To enable the reed to operate at proper times, I provide a first control including relay means responsive to a received carrier signal, and this relay, when operated by the carrier, functions to render operative a circuit element such as an audio-amplifier to receive and amplify the modulation signals. I connect at the output of this circuit element a responsive device such as a relay coil to operate the vibratory reed whenever a particular modulation signal is received at the particular frequency at which the vibratory reed is resonant.

When the reed is thus vibrated, it functions to render the output of the receiver operative and also to render operative another control including relay means provided with a lock-in circuit with the first-mentioned relay means to maintain the system in operation regardless of whether the calling modulation frequency is present or not. In this way, the receiver is held operative to receive signals from the calling station so long as carrier is present; but as soon as the carrier is discontinued, the relays are dropped back to their inoperative positions so that the receiver is again rendered ready to receive a subsequent call.

The foregoing and other features of my invention will be better understood from the following detailed description and the accompanying drawing which shows a portion of a receiver provided with means for rendering it operative by transmission of a call signal, in accordance with my invention.

The receiver illustrated in the drawing is of the frequency modulated type and comprises tuned intermediate frequency transformer 1, having a primary winding 2 and a secondary winding 3, the primary winding being tuned by a condenser 4 and the secondary winding being tuned by a condenser 5, according to a common practice. The primary circuit of the transformer has impressed thereon the modulated intermediate frequency signal over leads 6 and 7; and these intermediate frequency signals may be supplied from the output of the intermediate frequency amplifier of the radio receiver according to a well known conventional manner which need not be described here.

There is connected to the secondary circuit of the transformer 1 a limiter tube 8 which may be a conventional type of limiter used in frequency modulation receivers, having a cathode 9, a control grid 10 and an anode 11. The output of limiter tube 8 is preferably, although not necessarily, connected to a second limiter stage represented by the diagrammatic rectangle 12, the output of which is connected to a discriminator stage 13 which may be some suitable form of discriminator well known in the art, which functions to deliver the modulation frequencies.

There is connected to the output of the discriminator an audio amplifier stage comprising a vacuum tube 14 which is shown to be of the triode type having a filamentary cathode 15, control grid 16 and anode 17. An audio frequency output transformer 18 is connected to the output of the audio amplifier 14 and a suitable loudspeaker or receiver 19 connected to the output of the output transformer.

It is desired to maintain this receiver inoperative until a calling station transmits a call of a particular character calculated to render the receiver operative, and according to my invention, I have provided in association with the receiver, means for doing this. I have provided means for calling and rendering the receiver operative upon receipt of a call, and holding it operative so long as a carrier frequency is received from the calling station. This control means comprises a trigger system, and the particular triggering means I have provided is a gas filled thyratron tube 20 which is shown as a type having a cathode 21, a control grid 22, a shield grid 23 and an anode 24. There is connected in the anode circuit of the tube 20 a relay coil 25 in series between the anode 24 of a source of D.-C. operating voltage marked B+, the negative side of this D.-C. voltage source, marked B−, being connected to the cathode 21 through the tapped-off portion of a potentiometer 26, the opposite end of the potentiometer being connected to the shield grid 23. There is connected between the anode 24 and the shield grid 23 a condenser 27. The value of the anode voltage supplied from the B+ voltage source is normally sufficiently high to cause relaxation type oscillations in the circuit of condenser 27 and coil 25, the frequency of these oscillations being determined by the particular values of this coil and condenser.

Provision is made for stopping the oscillations when a carrier signal is received from the transmitting station; and this means comprises a rectifying circuit comprising a resistor 28 and a condenser 29 in parallel with it, the parallel-arranged resistance and condenser being connected between the cathode 9 and the lower end of the secondary resonant circuit of transformer 1. By reason of this resistor-condenser arrangement, rectification occurs in the grid circuit of the limiter tube 8, in the presence of carrier signals, with a resulting unidirectional current flowing through resistor 28. One side of resistor 28 is connected to ground, and the other side is connected through a resistor 30 to the grid 22 of the thyratron. Since the cathode 21 of the thyratron is also connected through to ground (through potentiometer 26 and two resistors 31 and 32 all in series), the effect of the unidirectional current through resistor 28 is to make grid 22 more negative. When the grid 22 is thus made negative, it blocks the thyratron stopping the oscillations in the circuit of relay coil 25 the complex impedance of which is principally resistive, and capacity 27, and accordingly shutting down the current flow through relay coil 25.

The relay controls three armatures 33, 34 and 35, these armatures being adapted to make contact with the respective armature contacts 36, 37 and 38. The arrangement is such that when the circuit of condenser 27 and coil 25 is in its oscillating condition, there is enough current through the coil to hold all three of the armatures down and away from their respective contacts; but when the oscillations are stopped by the presence of a carrier wave at the receiver, the three armatures drop back against their contacts.

When armature 34 closes against its contact 37, it closes the previously open circuit through the filament 15 of audio-amplifier 14 from across the source of filament voltage, the positive and negative terminals of which are marked $+f$ and $-f$, respectively. This puts the previously inoperative tube 14 into operating condition.

Armature 33, when closed against its contact 36, functions to place a short circuit across the bias bleeder resistor 32. This shorting of the bleeder resistor coincident with the placing into operation of the previously inoperative audio-amplifier is in accordance with good practice in those cases where the power supply is so arranged that the added drain on the power supply from the audio-amplifier would otherwise produce undesirable changes in the delivered power voltages. It is desirable to compensate for the change in power supply voltage due to the added drain, by correspondingly changing the resistance in the grid biasing circuit.

The other armature 35, when closed against its contact 38, functions to set up a lock-up circuit through an armature 39 and contact 40 of a relay coil 41, when this latter relay becomes energized, as will be described hereinbelow.

Even though the normally inoperative audio amplifier 14 is rendered operative by the presence in the receiver of a carrier frequency, as has just been described, this alone will still not render the receiver operative to deliver signals to the loudspeaker or headphones or the like 19, because there still exists a short circuit across the primary winding of output transformer 18. This short circuit exists over conductors 42 and 43 and the normally closed contact 44 with armature 45. Armature 45 is one of two armatures controlled by relay coil 41, the other armature being the previously mentioned armature 39. So long as relay coil 41 remains in its deenergized condition, the two armatures 39 and 45 are in their up position, that is, armature 39 remains out of contact with its contact 40, and armature 45 remains in contact with its back contact 44 and out of contact with its front contact 46.

In order to complete the placing into operation of the receiver so that signals can be heard through the loudspeaker or the headphones 19, I provide an electromagnetic coil 47 in the anode circuit of amplifier tube 14, in series between the anode 17 and the primary winding of the output transformer 18; and I provide in conjunction with the coil a vibratory reed 48 sharply resonant at a definite frequency so that when this resonant frequency, or one very close to it, is sent through the coil 47, the reed will vibrate. The reed has connected with it a pair of contacts 49 and 50 arranged to vibrate in and out of contact with each other by the vibration of the reed. The vibrating of these contacts together serves to send current intermittently through relay coil 41 from the B+ source of high D.-C. voltage, the circuit for this operation passing from ground through the relay coil 41, over conductor 51, through the contacts 50 and 49, and conductors 52 and 42 to the B+ terminal of the voltage supply. Condenser 53 is used to integrate the pulses of direct current resulting from intermittent closure of contacts 49 and 50 in order to provide a reasonably steady flow of current through relay coil 41.

As soon as coil 41 becomes energized by the vibrating of the reeds, the armatures 39 and 45 are pulled in, armature 39 making contact with its contact 40 and armature 45 breaking away from its contact 44 and making contact with 46. The breaking of contact at 44 serves to remove the short circuit across the input winding of transformer 18 so that the receiver now becomes fully operative to deliver signals to loudspeaker 19. The making of contact at armature 39 and contact 40 serves to complete the lock-up circuit which has been set up over armature 35 and its contact 38, and is now completed through relay winding 41 from the B+ source of D.-C. voltage to ground. Accordingly, the current from the voltage source and through coil 41 will now pass over armature 39 and contact 40 to maintain coil 41 energized even after the reed 48 stops vibrating; and this energization of coil 41 with consequent operativeness of the receiver will continue so long as carrier signal is present at the receiver to hold armature 35 against its contact 38. Accordingly, the ability of the receiver to deliver signals from the transmitting station will thereafter depend on the presence of carrier, and will not depend on the modulation signals which are present.

The resonant frequency to which the vibrating reed 48 is made resonant is not especially critical, but preferably it will be in the low audio-frequency range and the resonance will be quite sharp. Accordingly, the reed will be vibrated by the presence of a modulation signal of this particular resonance frequency, which will be the call frequency of the station.

In operation, the operator at the transmitting or calling station will turn on his carrier which will be picked up at the receiving station, and the carrier will produce the rectified current in resistor 28 to deenergize relay coil 25 and render the audio-amplifier 14 operative. Then, to call and put the receiving station finally into operation, the operator at the transmitting station will transmit the call frequency for a short time by modulating his transmitted carrier by the particular call frequency, which has been designated, so that the transmitting station will send out a carrier frequency which is frequency modulated by the call signal. This call signal will be separated at the discriminator 13 of the receiver in the usual manner of frequency modulated receivers, and will be delivered as a call signal to the grid 16 of amplifier 14, and accordingly sent through the coil 47 at the output of the audio amplifier to operate the reed, which in turn renders the receiver fully operative to transmit the signals to the speaker 19 and to hold the receiver operative by operation of the relay coils 41 and 25 as has been explained hereinabove.

The particular values of the various circuit elements which have been used is not especially critical and it is only required that proper interrelated values be given to the several coils, condensers and resistors to make them mutually cooperate according to good practice to produce the effects described. For the thyratron tube 20, a tube of the 2-D-21 type has been found satisfactory. Values of other circuit elements which have been found satisfactory for use with this type of tube are as follows:

Condenser 27, 0.1 microfarad
Relay coil 25, 12,000 ohms
Potentiometer 26, 200 ohms
Resistor 31, 200 ohms
Resistor 32, 200 ohms
Resistor 28, 22,000 ohms
Condenser 29, .00005 microfarad
Resistor 30, 220,000 ohms
Tube 14—type 2E30: Filament voltage for tube 14, 6.3 volts
Plus B voltage, 180 volts In operating the foregoing thyratron type tube in the circuit, it has been found that oscillations can be made to cease with a change in bias in the order of 0.4 volt. The absolute value of bias about which the 0.4 volt change is operated is adjustable by means of the potentiometer 26, and in practice this potentiometer has been made adjustable from approximately 0 to −8 volts. This is made adjustable in order to allow for variations in noise level which are to be expected in various localities of the receiver installations.

Although a particular form of receiver and operating circuit has been illustrated and described in detail as showing a particular embodiment of my invention, it will be understood that variations and modifications may suggest themselves in particular instances, all within the scope of the invention. The invention, moreover, is not limited to use with frequency modulation communication systems, as it is also applicable to other kinds of modulation systems such as amplitude modulation systems.

Among the various modifications of the foregoing described system which may be made within the scope of the invention is a "carrier squelch" operation. This may be done by simply short circuiting the contacts 39 and 40 of relay coil 41. If no squelch at all is desired, the contacts 39 and 40 would be shorted and the filament circuit of thyratron 20 opened.

It will be recognized that by my invention I have provided a highly useful calling and operating system for communicating from a transmitting station to an outlying receiving station, for example, a mobile field unit, such as a police car or the like which may be called from headquarters. The system is singularly simple and relatively inexpensive in comparison with other kinds of systems which have been proposed for similar purposes.

I claim:

1. In a system for rendering a signal receiver operative in response to a predetermined signal, means to detect a signal modulated carrier, a reproducing device, a predetermined signal responsive device, means to apply received signals to both said devices, control means to normally render said reproducing device inoperative, said signal responsive device being operative in response to said predetermined signal to operate said control means to render said reproducing device operative, and means responsive to reception of said carrier to maintain said control means in said operative condition, said control means having means to render said signal responsive device inoperative in response to said control means being in said operative condition.

2. In a system for rendering a signal receiver operative in response to a predetermined signal, means to detect a signal modulated carrier, a reproducing device, a predetermined signal responsive device, means to apply received signals to both said devices, control means to normally render said reproducing device inoperative, said signal responsive device being operative in response to said predetermined signal to render said control means operative, to render said reproducing device operative, said control means having means to hold it in operative condition when actuated and means to render said signal responsive device inoperative in response to said control means being in said operative condition.

3. In a system for calling a signal receiving station from a signal modulated carrier transmission station, the receiving station having a normally inoperative vacuum tube stage, a normally inoperative signal reproducer and a vibratory element resonant at a predetermined signal frequency coupled to the output of said vacuum tube stage, a gaseous discharge tube having in circuit therewith an oscillatory system which is in a normally oscillating condition, means responsive to received carrier for stopping the oscillations in said system, means responsive to said oscillatory system for rendering said normally inoperative vacuum tube stage operative upon stopping of the oscillations, said vibratory element responsive to the receipt of a modulation signal at its resonant frequency from the output of said vacuum tube stage for vibrating, and a circuit controlled by the vibrations of said vibratory element for rendering said signal reproducer operative and a second means for holding said vacuum tube stage and signal reproducer operative in response to the reception of solely the carrier signal after the modulation signal has ceased.

4. In a system according to claim 3 in which the gaseous discharge tube is a thyratron.

5. In a system according to claim 3 in which the gaseous discharge tube is a thyratron, and the means responsive to the oscillatory system comprises a relay which renders said vacuum tube stage operative.

6. In a system for calling a signal receiving station from a signal modulated carrier transmission station, the receiving station having a normally inoperative vacuum tube stage and a normally inoperative audio output; a vibratory element resonant at a predetermined frequency of the calling signal, a thyratron having an oscillatory output circuit normally maintained in an oscillating condition, rectifying means for developing a unidirectional voltage responsive to received carrier, means for applying said unidirectional voltage on a control electrode of the thyratron in the polarity which stops the oscillations, a first relay operable by the stopping of the oscillations, a connection from the relay to the vacuum tube stage for rendering the stage operative upon operation of the relay, said vibratory element being responsive to the output of said stage, a second relay energized in response to the vibrating of the vibratory element, said audio output being rendered operable in response to the energization of the second relay, and a lock-up circuit through contacts of the second relay closed by operation of second relay and through contacts of the first relay closed by by operation of said first relay for holding the second relay energized in response to the first relay being maintained operable by continued receipt of the carrier.

ROBERT C. FERRAR.

REFERENCES CITED

The following references are of record in the file of this patent:

UNITED STATES PATENTS

| Number | Name | Date |
|---|---|---|
| 1,635,779 | Carter | July 12, 1927 |
| 2,202,432 | Santucci | May 23, 1940 |
| 2,264,018 | Case | Nov. 25, 1941 |
| 2,361,653 | Van Roberts | Oct. 31, 1944 |

OTHER REFERENCES

Millman and Seely, "Electronics," McGraw Hill (1941), page 334. (Copy in Library of Congress.)